United States Patent
Okubo et al.

(10) Patent No.: US 6,527,536 B2
(45) Date of Patent: Mar. 4, 2003

(54) MOLD-THICKNESS ADJUSTMENT MECHANISM FOR TOGGLE TYPE VERTICAL MOLDING MACHINE

(75) Inventors: Hiroo Okubo, Nagano-ken (JP); Junichi Yamashita, Nagano-ken (JP); Isamu Yamaguchi, Nagano-ken (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

(21) Appl. No.: 09/821,607

(22) Filed: Mar. 29, 2001

(65) Prior Publication Data
US 2001/0026818 A1 Oct. 4, 2001

(30) Foreign Application Priority Data
Mar. 31, 2000 (JP) .......................... 2000-097003

(51) Int. Cl.[7] .............................. B29C 45/66
(52) U.S. Cl. ...................... 425/190; 425/593
(58) Field of Search ................. 425/190, 593, 425/451.6

(56) References Cited

U.S. PATENT DOCUMENTS

| | | | | |
|---|---|---|---|---|
| 4,695,238 A | * | 9/1987 | Taniguchi | 425/593 |
| 5,565,224 A | * | 10/1996 | Stillhard | 425/593 |
| 5,585,126 A | * | 12/1996 | Heindl et al. | 425/593 |
| 6,004,490 A | * | 12/1999 | Tsai | 425/593 |
| 6,024,560 A | * | 2/2000 | Ito et al. | 425/593 |

\* cited by examiner

Primary Examiner—James P. Mackey
(74) Attorney, Agent, or Firm—Weingarten, Schurgin, Gagnebin & Lebovici LLP

(57) ABSTRACT

A mold-thickness adjustment mechanism is provided which uses intermediate toothed wheels engaging with a pair of toothed wheels on a tie-bar side. The mechanism includes a toothed wheel on an outer surface of a pressure-receiving plate and toothed wheels with a large diameter for mold-thickness adjustment provided together with a toothed wheel-driving motor on the side of the pressure-receiving plate on the central portion of an outer surface of the pressure-receiving plate. Intermediate toothed wheels are arranged between the toothed wheels with the large diameter and a pair of toothed wheels of one side of the pressure-receiving plate to engage each other. A pair of the toothed wheels is designed to rotate by rotation of the intermediate toothed wheels at the same time, whereby a diameter of the toothed wheel with the large diameter is constituted approximately equally to the breadth of the plate body of the pressure-receiving plate.

2 Claims, 3 Drawing Sheets

MOLD-THICKNESS ADJUSTMENT MECHANISM FOR TOGGLE TYPE VERTICAL MOLDING MACHINE

BACKGROUND OF THE INVENTION

1. Field of the Invention

This invention relates to a mold-thickness adjustment mechanism for toggle type vertical molding machine in which any one of a pressure-receiving plate or a movable platen which an end of a tie-bar is clamped and fixed is moved in the advancing and/or retreating directions by turning an adjusting nut, whereby mold-thickness adjustment is performed.

2. Detailed Description of the Prior Art

It has been known a mold-thickness adjustment mechanism in which while ends of four pieces of tie-bar constituting a mold-clamping mechanism are secured to a fixed plate, the other ends are formed into threaded shafts, and are clamped and fixed to the pressure-receiving plate by means of the adjusting nuts (a tie-bar nut) with a toothed wheel of an outer surface of the pressure-receiving plate, and toothed wheels with a large diameter for mold-thickness adjustment which are moved in the advancing and/or retreating directions together with the movable platen on the pressure-receiving plate by turning those adjusting nuts through the toothed wheel are provided together with a toothed wheel-driving motor of a side of the pressure receiving plate on a central of the outer surface of the pressure-receiving plate.

This prior mold-thickness adjustment mechanism is engaged with the toothed wheel of the adjusting nut screwed to each tie-bar nut and the toothed wheel with the large diameter directly or through intermediate toothed wheels with a small diameter individually. Since most of the pressure-receiving plate, the movable platen and the fixed plate are based on a square plate body, the toothed wheel with the large diameter is accommodated therein, whereby it can not be extruded in a horizontal molding machine, however, since both of a position which insertion or the like is performed on a base and a position which injection is performed are provided on the base, the mold-clamping mechanism should be installed approaching toward an injection device side, moreover, an oblong plate body is used for the pressure-receiving plate in a vertical-rotary type molding machine.

When using the toothed wheel with the large diameter engaging with each tie-bar directly for the mold-thickness adjustment mechanism of such vertical molding machine in the same way as the case of the horizontal molding machine, the toothed wheel with the large diameter 16a is extruded from both sides of the oblong plate body largely as shown in FIG. 1 by a phantom line, so that the toothed wheel-driving motor can not be installed on the side portion of the plate body and an inconvenience also is caused in installation of a safety cover.

Moreover, in such toothed wheel with the large diameter 16a as is extruded from the plate body, a support portion is limited within the range of the central portion of the plate body, and since especially, an extrusion region of the toothed wheel with the large diameter can not be supported with an annular spur gear rotating and supporting an inner peripheral side by a number of rollers, a shake in a horizontal rotation tends to cause, and misalignment in an engagement manner is caused for the long term use, so that it can interfere with the smooth horizontal-rotation.

SUMMARY OF THE INVENTION

The present invention is devised for solving the prior problems described above, and the object of present invention is to provide a new constitution which has solved an inconvenience where using a mold-thickness adjustment mechanism according to toothed wheels with a large diameter for a toggle type vertical mold-clamping device in which a fixed plate, a pressure-receiving plate and a movable platen or the like is constituted by an oblong plate body, by using the intermediate toothed wheels engaging with a pair of toothed wheels on a tie-bar side.

The present invention for accomplishing the object described above is a toggle type vertical molding machine constituted by forming a fixed plate, a pressure-receiving plate and a movable platen into an oblong shape to insert the movable platen into tie-bars in four corners of the fixed plate and the pressure-receiving plate and to install a mold-clamping device which toggle mechanisms 9 for mold-clamping are provided across the pressure-receiving plate and the movable platen on a base, arranging the pressure-receiving plate in an upper side, wherein while the described-above ends of tie-bars are secured to the fixed plate, the other ends are formed into threaded shafts 5, and are clamped and fixed to the pressure-receiving plate by means of adjusting nuts with a toothed wheel on an outer surface of the pressure-receiving plate, which toothed wheels are in position, and toothed wheels with the large diameter for mold-thickness adjustment which are moved in the advancing and/or retreating directions together with the movable platen on the pressure-receiving plate by turning those adjusting nuts through the toothed wheel are provided together with a toothed wheel-driving motor on the side of the pressure-receiving plate on the central portion of an outer surface of a pressure-receiving plate, and intermediate toothed wheels are arranged between the toothed wheel with the large diameter and a pair of described-above toothed wheels of one side of the pressure-receiving plate to engage each other and to rotate a pair of the toothed wheels at same time by rotation of the intermediate toothed wheels, whereby a diameter of the toothed wheel with the large diameter is constituted approximately equally to a breadth of the plate body of the pressure-receiving plate.

The other one of the present invention is a toggle type vertical molding machine constituted by forming a fixed plate, a pressure-receiving plate and a movable platen into an oblong shape to insert tie-bars 4 in the four corners of the pressure-receiving plate and the fixed plate into the fixed plate and to install a mold-clamping device which the toggle mechanisms for mold clamping are provided across the fixed plate and the pressure-receiving plate on the base, arranging the movable platen 3 in an upper side, wherein while the described-above ends of tie-bars are secured to the fixed plate, the other ends are formed into threaded shafts 5, and are clamped and fixed to the pressure-receiving plate by means of adjusting nuts with a toothed wheel on an outer surface of the pressure-receiving plate, which toothed wheels are in position, and toothed wheels with the large diameter for mold-thickness adjustment which the movable platen are moved in the advancing and/or retreating directions by turning those adjusting nuts through the toothed wheel are provided together with a toothed wheel-driving motor on the side of the pressure-receiving plate on the central portion of an outer surface of the movable platen, and intermediate toothed wheels are arranged between the toothed wheel with the large diameter and a pair of described-above toothed wheels of one side of the pressure-receiving plate to engage each other and to rotate a pair of the toothed wheels at same time by rotation of the intermediate toothed wheels, whereby a diameter of the toothed wheel with the large diameter is constituted approximately equally to the breadth of the plate body of the pressure-receiving plate.

The diameter of the toothed wheel with the large diameter in the described-above constitution is specified depending upon the breadth of the plate body of the pressure-receiving plate or the movable platen, and the diameter of the intermediate toothed wheel becomes the size that the intermediate toothed wheels can engage with both of the toothed wheel with the large diameter and a pair of toothed wheels on one side. The diameter of the toothed wheel with the large diameter in such mold-adjustment mechanism can be formed into a smaller size and to be able to adapt to the plate body narrow in breadth and oblong, whereby the inconvenience due to extrusion of the toothed wheel with the large diameter from the plate body can be solved even the vertical mold-clamping device with the mold-adjustment mechanism according to a group of the toothed wheels can be finished in a compact size at the upper thereof.

BRIEF DESCRIPTION OF THE DRAWINGS

These and other objects and advantages of the present invention will become clear from the following description with reference to the accompanying drawings; wherein.

DETAILD DESCRIPTION OF THE PREFERRED EMBODIMENT

Figure 1:
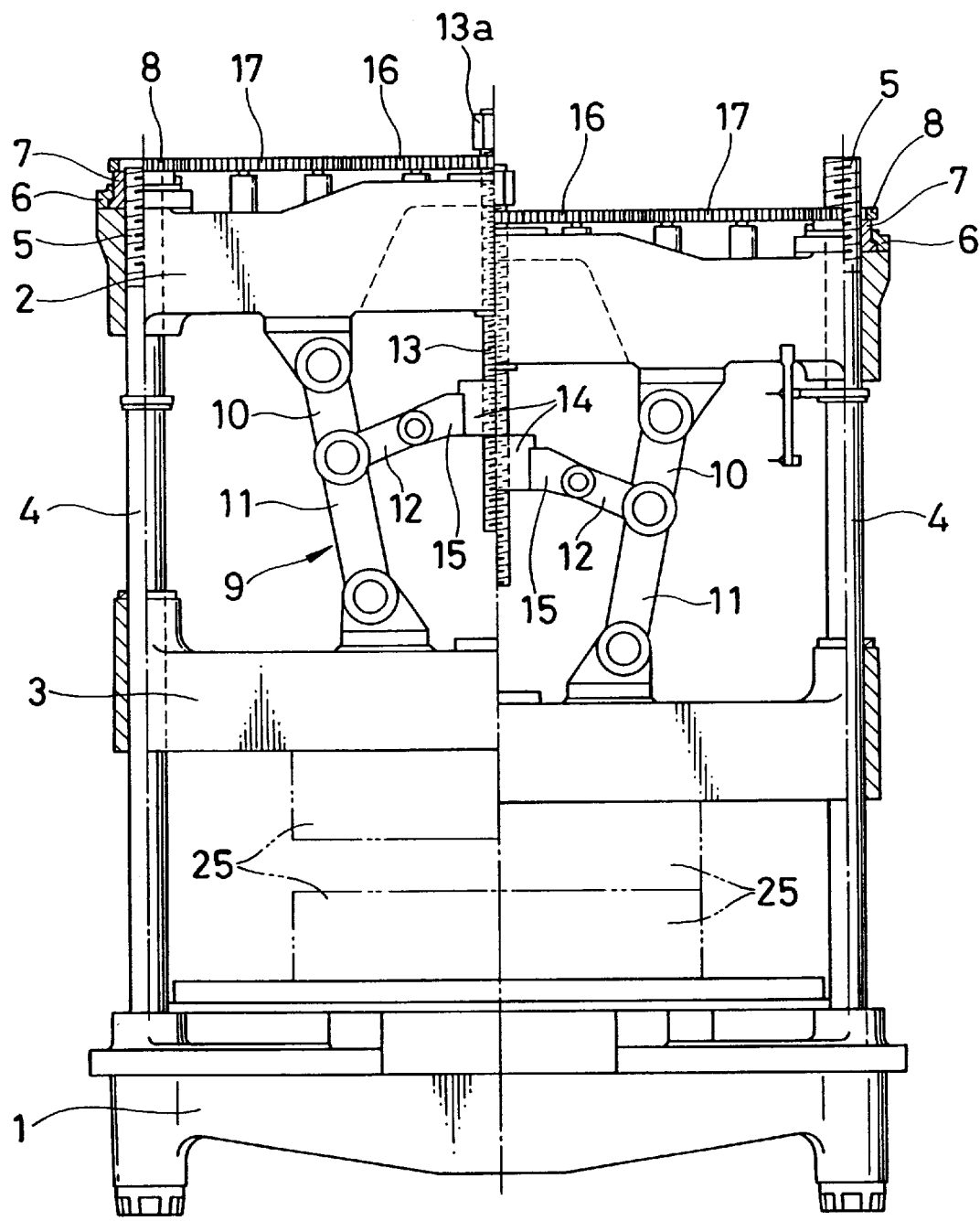
FIG. 1 is a partial-longitudinal sectional front elevation of a first embodiment showing conditions before and after mold-thickness adjustment in a mold-thickness adjustment mechanism for a toggle type vertical molding machine according to the present invention, the conditions being shown by one half.
Figure 2:
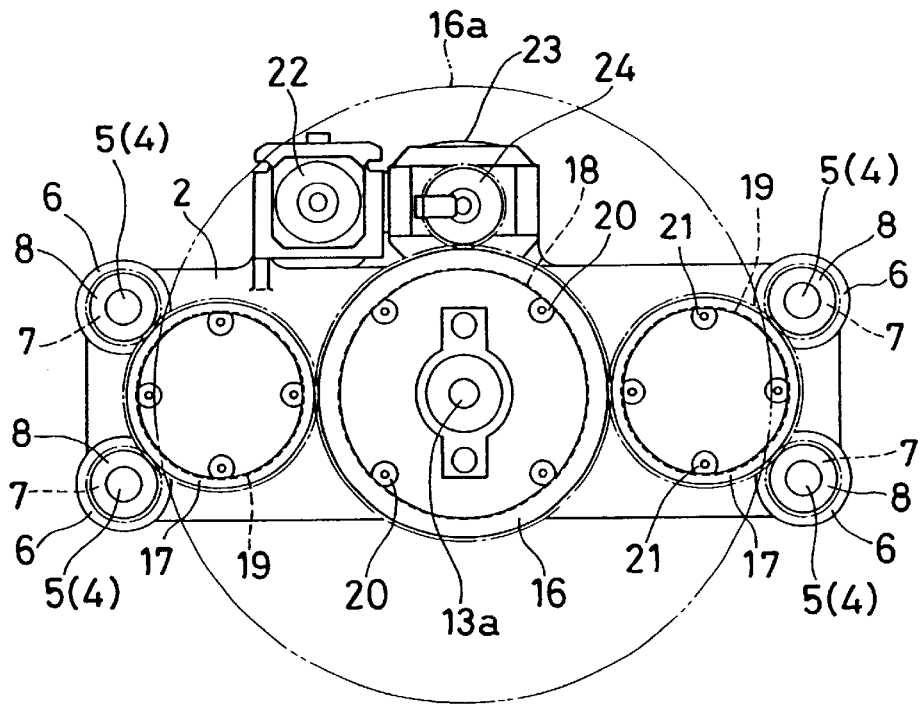
FIG. 2 is a top plane view in FIG. 1.
Figure 3:
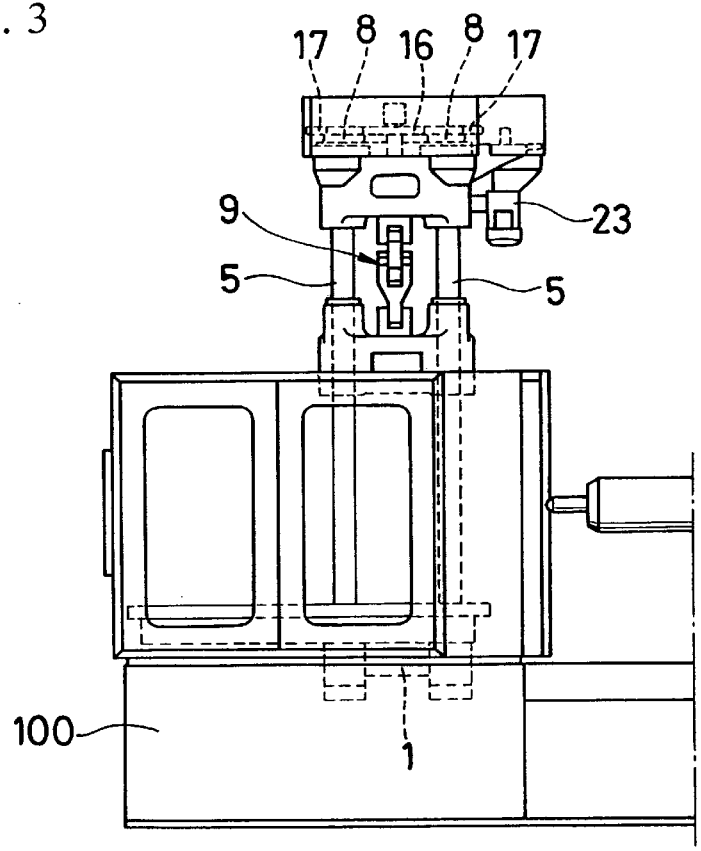
FIG. 3 is a front elevation of the toggle type vertical molding machine which the mold-thickness adjustment mechanism of the first embodiment is provided.

FIG. 1 to FIG. 3 show one example of the toggle type vertical molding machine constituted by forming a fixed plate 1, a pressure-receiving plate 2 and a movable platen 3 into an oblong shape to insert the movable platen 3 into tie-bars 4 in the four corners of the fixed plate 1 and the pressure-receiving plate 2 and to install a mold-clamping device in a first embodiment which the toggle mechanisms 9 for mold clamping are provided across the pressure-receiving plate 2 and the movable platen 3 vertically on a base 100, arranging the pressure-receiving plate 2 in an upper side.

Ends of four pieces of tie-bar doubling as a guide of the described-above movable platen 3 are secured to the fixed plate 1 by a tie-bar nut, moreover, the other ends are formed into threaded shafts 5, and are clamped and fixed to the pressure-receiving plate 2 by means of adjusting nuts 7 in position provided so as to turn freely with fixed members 6 on an outer surface of the pressure-receiving plate 2. An annular small-size toothed wheel 8 is attached to an outer surface of the adjusting nut 7 unitarily, and the adjusting nut 7 rotates together with the toothed wheel 8 to move the pressure-receiving plate 2 in the advancing and/or retreating directions along the tie-bar 4.

A reference numeral 9 is a toggle mechanism for mold clamping, and is provided across the pressure-receiving plate 2 and the movable platen 3. This toggle mechanism 9 is constituted by directing an actuating-link plate 12 coupled by a pin together with a pair of link plates 10 and 11 toward an inward direction, a pair of links of the left and the right which one link plates 10 is coupled by a pin to the pressure-receiving plate side and the other one link plates 11 to the movable platen respectively, a threaded shaft 13 inserted through a central portion of the pressure-receiving plate 2 and supported so as to turn freely and provided on the central portion of the link and a nut-shaped link-actuating member 14 screwed to the threaded shaft 13, and is constituted by a conventional structure in which the movable platen 3 is moved in the advancing and/or retreating directions to the fixed plate 1 by coupling by a pin a pair of actuating-link plates 12 of the left and the right positioned oppositely via a lug piece 15 to the link-actuating member 14 and to bend or extend the link plates 10 and 11 through a movement of the link-actuating member 14 by turning of the threaded shaft 13. Moreover, a reference numeral 13a is a pulley outside the threaded shaft 13.

A reference numeral 16 is a toothed wheel with a large diameter providing the main toothed wheel for mold-thickness adjustment provided on the central portion of the outer surface of the pressure-receiving plate 2 and a reference numeral 17 is a pair of intermediate toothed wheels, and they are constituted by annular spur gears having the support grooves 18 and 19 on an inner radius, and are born horizontally so as to rotate freely on the outer surface of the pressure-receiving plate 2 by supporting four points of the inner peripheral by means of rollers 20 and 21 fitted and inserted into each support groove 18 and 19.

Moreover, the described-above toothed wheel 16 with the large diameter is constituted by a diameter slightly larger than the breadth of the plate body of the pressure-receiving plate 2, and the intermediate toothed wheel 17 is smaller in diameter than the toothed wheels 16 with the large diameter and a diameter engaging with the toothed wheels 16 with the large diameter and a pair of described-above toothed wheels 8 and 8 of one side of the pressure-receiving plate 2.

A reference numeral 22 is a toothed wheel-driving motor reversible in the forward and reverse directions constituted by an electric servo motor or the like, and is attached to the side of the pressure-receiving plate together with a reduction gear 23 with an encoder, and is designed to engage a toothed wheel 24 of a driving shaft end of the reduction gear 23 with the described-above toothed wheels 16 with the large diameter to rotate in either of the direction of the left or the right through a rotating operation of the toothed wheel-driving motor 22.

Figure 4:
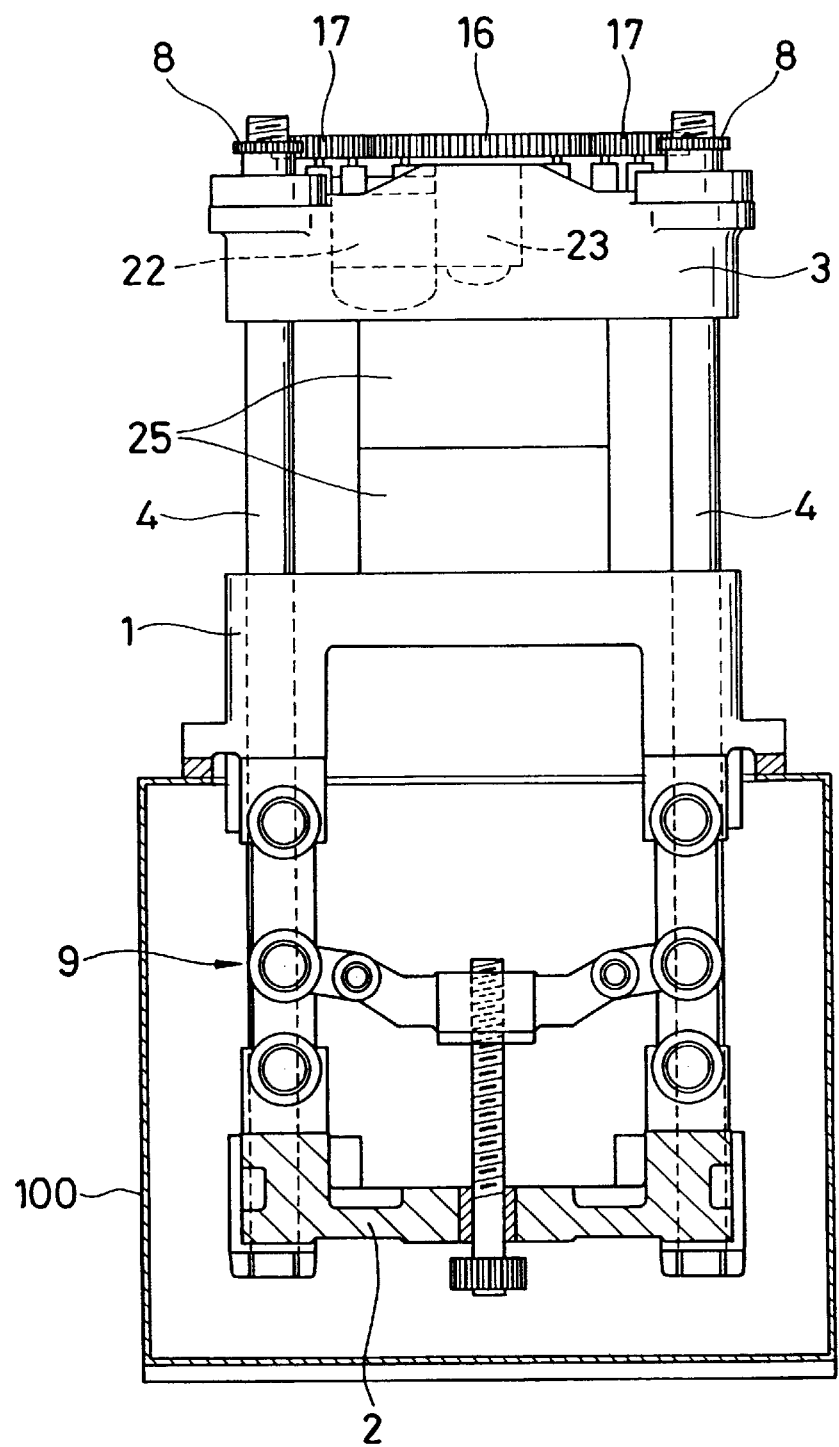
FIG. 4 is a partial-longitudinal sectional front elevation of the toggle type vertical molding machine which the mold-thickness adjustment mechanism of the first embodiment is provided.

FIG. 4 shows one example of a toggle type vertical molding machine with a traction type mold-clamping system constituted by forming a fixed plate 1, a pressure-receiving plate 2 and a movable platen 3 into an oblong shape to insert tie-bars 4 in the four corners of the fixed plate 1 and the pressure-receiving plate 2 into the fixed plate 1 and to install a mold-clamping device of a second embodiment which the toggle mechanisms 9 are provided across the fixed plate 1 and the pressure-receiving plate 2 vertically on a base 100, arranging the movable platen 3 in an upper side.

In vertical molding machine with such structure, since the same toggle mechanisms 9 as in FIG. 1 are provided across the fixed plate 1 and the pressure-receiving plate 2, the ends of four pieces of tie-bar 4 are clamped and fixed to the movable platen 3 by securing to the fixed plate 1 by the tie-bar nut to insert the other ends formed into the threaded shafts 5 in the same way in FIG. 1 through the movable platen 3 (not shown in the drawing) positioned at the upper to screw the described-above adjusting nut 7 of the outer surface of the movable platen to the threaded shaft 5. This adjusting nut 7 is the same as the first embodiment shown in FIG. 1 and FIG. 2 in which the annular small-size toothed wheel 8 is attached to the side surface unitarily, and the adjusting nut 7 rotates together with the toothed wheel 8 to move the pressure-receiving plate 2 in the advancing and/or retreating directions along the tie-bar 4.

Moreover, the toothed wheels 16 with the large diameter and the intermediate toothed wheels 17 for mold-thickness adjustment also are arranged on the central of the outer surface of the movable platen 3 and the left side and right side thereof with the same engagement condition as described above, and are designed to rotate in either of the direction of the left or the right through a rotating operation of the toothed wheel-driving motor 22 attached to the side portion of the pressure-receiving plate together with the reduction gear 23.

In the case where performing mold-thickness adjustment, it is performed after attaching a mold 25 to the opposed surface of the fixed plate 1 and the movable platen 3 in the condition of being divided to extend the toggle mechanisms 9 as shown in the half of the left side in FIG. 1 as is a conventional manner in both of them in the described-above embodiments. Actually, it is performed in the condition before completely extending.

When rotating the described-above toothed wheels 16 with the large diameter in the right direction by the toothed wheel-driving motor 22, the rotating force is transmitted to a pair of toothed wheels 8 and 8 of both sides of the pressure-receiving plate 2 and the movable platen 3 through the intermediate toothed wheels 17 and 17 at same time, and the adjusting nut 7 rotates in the right direction together with these toothed wheels 8 and 8, whereby the pressure-receiving plate 2 is pressurized by the adjusting nut 7 to move downwardly together with the movable platen 3 along the tie-bar 4 in the first embodiment and to transfer to the mold-closed condition of the half of the right side in FIG. 1. Moreover, only the movable platen 3 is pressurized to move downwardly in the second embodiment.

When the mold 25 is closed to cause resistance, rotation of the toothed wheel-driving motor 22 is stopped, providing the position as a mold-clamping position, and that position would be held. This travel of the pressure-receiving plate 2 or the movable platen 3 is different depending upon the mold thickness of the mold 25 to be used, and after returning the pressure-receiving plate 2 or the movable platen 3 by rotating the toothed wheels 16 with the large diameter in the left direction by means of the toothed wheel-driving motor 22, then mold-thickness adjustment is performed in accordance with the described-above procedure when the mold to be replaced is thick than the mold in use.

A mold-adjustment mechanism according to the described-above constitution can be formed into a reduced-size than the prior case in which the toothed wheels 16 with the large diameter is engaged with each toothed wheel 8 and 8 directly or through the intermediate toothed wheels individually, since the intermediate toothed wheels 17 engaging with the toothed wheels 8 and 8 of a pair of adjusting nuts 7 and 7 is arranged between the toothed wheels 16 with the large diameter and the toothed wheels 8 and 8. By means of this construction, even in the case where the vertical mold-clamping device constituted with the plate body narrow in breadth and oblong, the inner peripheral side by means of a number of rollers can be supported uniformly by forming the toothed wheels 16 with the large diameter into the size adapting to the plate body used therein, and the shake which tends to cause in the horizontal rotation can be prevented, moreover, the toothed wheel-driving motor can be attached to the side of the plate body easily and the safety cover can be attached easily, whereby the mold-clamping device with the mold-thickness adjustment mechanism can be finished in a compact size at the upper thereof.

Furthermore, since the toothed wheel with the large diameter is formed into a small diameter, the accuracy of manufacturing is improved and manufacturing becomes easy, whereby reduction in cost is provided, and since the weight is lightened, whereby the burden to the rotation-supporting member can be lightened and supporting strength also is increased, and misalignment in the engagement manner is resistant to be caused even in the case of the long term use, so that rotation of the toothed wheel with the large diameter can be maintained smoothly at all time.

While the presently preferred embodiment of the present invention has been shown and described, it will be understood that the present invention is not limited thereto, and that various changes and modification may be made by those skied in the art without departing from the scope of the invention as set forth in the appended claims.

What is claimed is:

1. A toggle type vertical molding machine comprising:
   a fixed plate on a base,
   a pressure-receiving plate spaced above the fixed plate, four tie bars interconnecting the fixed plate and the pressure-receiving plate at four corners thereof;
   a movable platen having an oblong shape and being positioned between the fixed plate and the pressure-receiving plate and movable along the tie-bars;

a mold-clamping device having toggle mechanisms for mold-clamping positioned between pressure-receiving plate and the movable platen, wherein one end of each of the tie-bars is secured to the fixed plate and the other end of each of the tie-bare is formed into threaded shafts, adjusting nuts cooperating with the threaded shafts of the tie-bars for clamping and fixing the tie-bars to the pressure-receiving plate, the adjusting nuts being positioned on an outer surface of the pressure-receiving plate and each adjusting nut having a first toothed wheel of a first predetermined diameter secured thereto;

a central toothed wheel of a second predetermined diameter centrally positioned on the outer surface of the pressure-receiving plate; and a pair of intermediate toothed wheels of a third predetermined diameter positioned on the outer surface of the pressure-receiving plate, each intermediate toothed wheel being positioned intermediate and engaging the central toothed wheel and a pair of said first toothed wheels, a toothed wheel-driving motor positioned on a side of the pressure-receiving plate for driving the central toothed wheel to thereby rotate each intermediate toothed wheel which rotates a respective pair of first toothed wheels at the same time, wherein the first diameter is less than the third diameter and the third diameter is less than the second diameter, and wherein the second diameter of the central toothed wheel is approximately equal to the breadth of the plate body of the pressure-receiving plate.

2. A toggle type vertical molding machine comprising:

a fixed plate on a base, a pressure-receiving plate spaced below the fixed plate, four tie bars interconnecting the fixed plate and the pressure-receiving plate at four corners thereof;

a movable platen having an oblong shape and being positioned above the fixed plate, the four tie bars interconnecting the fixed plate and the movable platen at the four corners of the movable platen;

a mold-clamping device having toggle mechanisms for mold clamping positioned between the fixed plate and the pressure-receiving plate, wherein first ends of said tie-bars are secured to the pressure-receiving plate and opposite ends of each of the tie-bars are formed into threaded shafts, adjusting nuts cooperating with the threaded shafts of the tie-bars for clamping and fixing the tie-bars to the moving platen, the adjusting nuts being positioned on an outer surface of the moving platen and each adjusting nut having a first toothed wheel of a first predetermined diameter secured thereto;

a central toothed wheel having a second predetermined diameter positioned on the outer surface of the moving platen; and a pair of intermediate toothed wheels of a third predetermined diameter positioned on the outer surface of the moving platens each intermediate toothed wheel being positioned intermediate and engaging the central toothed wheel and a pair of said first toothed wheels, a toothed wheel-driving motor positioned on a side of the moving platen driving the central toothed wheel to thereby rotate each intermediate toothed wheel which rotates a respective pair of first toothed wheels at the same time, wherein the first predetermined diameter is less than the third predetermined diameter and the third diameter is less than said second predetermined diameter, and wherein the second diameter of the central toothed wheel is approximately equal to the breadth of the plate body of the moving-platen.

* * * * *

UNITED STATES PATENT AND TRADEMARK OFFICE
CERTIFICATE OF CORRECTION

PATENT NO. : 6,527,536 B2
DATED : March 4, 2003
INVENTOR(S) : Hiroo Okubo et al.

It is certified that error appears in the above-identified patent and that said Letters Patent is hereby corrected as shown below:

<u>Column 7,</u>
Line 5, "tie-bare" should read -- tie-bars --;

<u>Column 8,</u>
Line 21, "platens" should read -- platen, --; and
Line 25, "platen driving" should read -- platen for driving --.

Signed and Sealed this

Fifteenth Day of June, 2004

JON W. DUDAS
*Acting Director of the United States Patent and Trademark Office*